(12) United States Patent
Hall

(10) Patent No.: US 7,014,446 B2
(45) Date of Patent: Mar. 21, 2006

(54) QUICK RELEASE VOLUME CONTROL INSERTS FOR MOLDING MACHINES

(75) Inventor: Gregory T Hall, Adrian, MI (US)

(73) Assignee: Uniloy Milacron Inc., Tecumseh, MI (US)

( * ) Notice: Subject to any disclaimer, the term of this patent is extended or adjusted under 35 U.S.C. 154(b) by 250 days.

(21) Appl. No.: 10/618,783

(22) Filed: Jul. 14, 2003

(65) Prior Publication Data

US 2005/0013891 A1    Jan. 20, 2005

(51) Int. Cl.
B29C 49/52    (2006.01)

(52) U.S. Cl. .................... 425/195; 425/182; 425/522; 249/102; 249/103

(58) Field of Classification Search .............. 425/182, 425/195, 522; 249/102, 103
See application file for complete search history.

(56) References Cited

U.S. PATENT DOCUMENTS

| | | | | |
|---|---|---|---|---|
| 132,897 | A | * | 11/1872 | Christie ........................ 249/103 |
| 490,966 | A | * | 1/1893 | Irwin ........................... 249/103 |
| 1,559,394 | A | * | 10/1925 | Williams ...................... 249/103 |
| 1,595,773 | A | * | 8/1926 | Gillinder ...................... 249/103 |
| 2,291,580 | A | * | 7/1942 | Poglein ........................ 249/102 |
| 2,919,470 | A | * | 1/1960 | Deters .......................... 249/103 |
| 3,570,057 | A | * | 3/1971 | Doyle ........................... 425/522 |
| 4,547,139 | A | * | 10/1985 | Hershberger ................. 425/195 |
| 4,551,084 | A | * | 11/1985 | Lake ............................ 249/102 |
| 4,684,101 | A | * | 8/1987 | Wagner et al. .............. 249/144 |
| 5,736,168 | A | * | 4/1998 | Goyal et al. ................. 425/522 |
| 6,315,539 | B1 | * | 11/2001 | Yutronkie et al. ........... 425/195 |

* cited by examiner

Primary Examiner—Robert B. Davis
(74) Attorney, Agent, or Firm—Brinks Hofer Gilson & Lione

(57) ABSTRACT

The present invention provides a molding machine and a mold assembly having a quick change volume control insert. The volume control insert can be changed without disassembly of the mold or use of special tools. The molding machine includes a mold, a mold insert, a locking member, and a release member. The mold insert is received in one of the mold halves and further includes a mold detail defining a portion of the mold cavity, and a retention member. A locking member engages the retention member when the mold detail is received within the mold half. The release member, accessible from the exterior of the mold half, and is adapted to disengage the locking member from the retention member, allowing the mold detail to be removed.

19 Claims, 3 Drawing Sheets

QUICK RELEASE VOLUME CONTROL INSERTS FOR MOLDING MACHINES

BACKGROUND

1. Field of the Invention

The present invention relates to molding machines. More specifically, the invention relates to quick change inserts provided in the cavity of a mold.

2. Description of the Related Art

The process of blow molding plastic containers is susceptible to many environmental and process variables, such as temperature, moisture, and pressure. These variables will affect the apparent volume of the container once filled with liquid. If the volume of the container is slightly larger than designed, the container may not appear full when the specified amount of liquid is dispensed into the container. For example, if the volume of a milk container is larger than one gallon, when the container is properly filled with one gallon of milk, the container will appear to be less than full, and a consumer might assume that the container has less than a full gallon of milk and not purchase that container. Therefore it is commercially undesirable for containers to appear less than full.

One method developed to adjust the apparent volume of the container locates an insert in the mold to change the volume of the mold cavity. In the past, this was accomplished by bolting a simple mechanical insert into the cavity of the mold. This had the disadvantage that the bolt fastening the insert would often be accessible only from the back of the mold, requiring complete removal of the mold from the machine in order to change the mold insert.

Another method that emerged for adjusting the volume of blow molded containers is to have the position of the insert adjusted by a pneumatic control. Using this method, pneumatic pressure is adjusted to extend or retract the insert relative to the surface of the mold cavity. The disadvantage of the pneumatic method is that the installation and removal of the insert requires a complex procedure and special tools, including a pneumatic pump. Additionally, there is a risk that the insert can fall out of the mold if the insert is not correctly installed or if the pneumatic system loses pressure, since a continuous vacuum draw is not provided.

In view of the above, there exists in the industry a need for volume control inserts that are readily accessible, can be quickly changed and do not require specific tools for changing them.

SUMMARY

In satisfying the above need, as well as overcoming the enumerated and other limitations of the prior art, the current invention provides a molding machine and a mold assembly having a quick change volume control insert. The volume control insert can be changed without disassembly of the mold or use of special tools.

In an embodiment of the present invention, a molding machine for blow molding a plastic article is provided. The molding machine is adapted to quickly adjust the volume of the plastic article and includes a mold, a mold insert, a locking member, and a release member. Located in the molding machine, the mold has two mold halves which form a cavity in the shape of the plastic article. The mold insert is located in one of the mold halves and further includes a body and a retention member. The insert body includes one or more surfaces that define a portion of the mold cavity while the retention member is interiorly received in the same mold half. Also located in the mold half, the locking member engages the retention member when the mold insert is received within the mold half. The release member is accessible from the exterior of the mold half without removing the mold from the machine and is adapted to disengage the locking member from the retention member allowing the mold insert to be removed.

In one embodiment, the release member is movable between a retracted position and an extended position. During the movement into the extended position the release member engages the retention member causing the locking member to disengage from the retention member. With the retention member disengaged, the mold insert is removable. To aid with removal, the insert may be biased away from the mold half when the locking member is disengaged from the retention member.

Further objects, features and advantages of this invention will become readily apparent to persons skilled in the art after a review of the following description, with reference to the drawings and claims appended to and forming a part of this specification.

DETAILED DESCRIPTION

Figure 1:
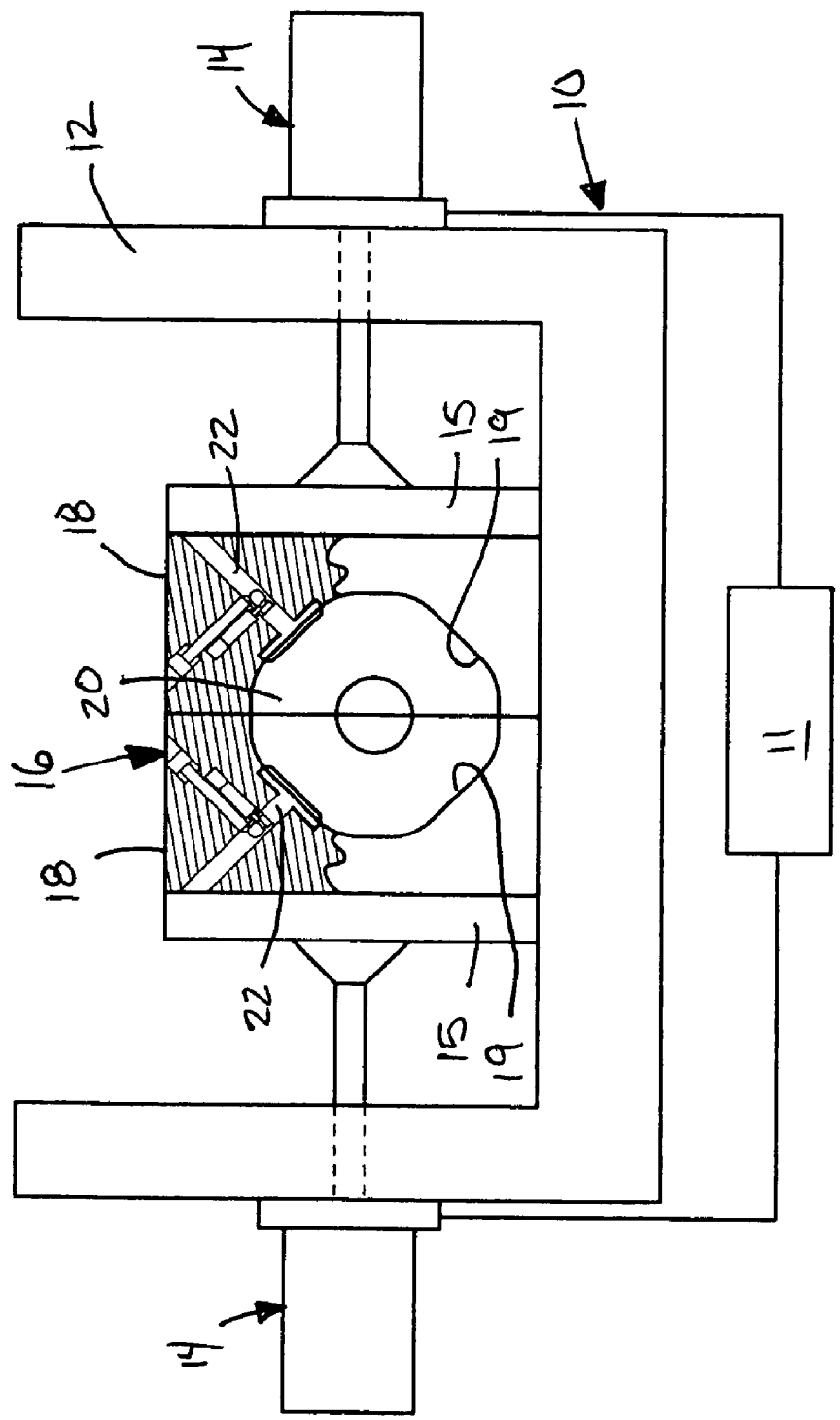
FIG. 1 is a diagrammatic top plan view of a molding machine embodying the principles of the present invention.

Referring now to the drawings, a molding machine 10 embodying the principles of the present invention is diagrammatically illustrated therein and designated at 10. As its primary components, the molding machine 10 includes a controller 11, a frame 12, actuators 14, platens 15 and a mold 16.

The actuators 14 are supported by the frame 12. Upon receiving appropriate signals from the controller 11, the actuators 14 cause the platens 15, which carry the mold 16, to move between open and closed positions during various stages of the molding process. The mold 16 itself is made up of two mold halves 18, having surfaces 19 which cooperate to form a mold cavity 20. Each mold half 18 is attached to a platen 15 coupled to an actuator 14 which closes the mold 16 during molding and separates the mold halves 18 to enable removal the molded container. The molding machine 10 is only diagrammatically shown in FIG. 1 since one skilled in this field will readily understand that the machine may take many forms and have features that are not essential for an understanding of the present invention. As seen in FIG. 1 a volume control insert 22 is incorporated into one or both mold halves 18.

Figure 2:
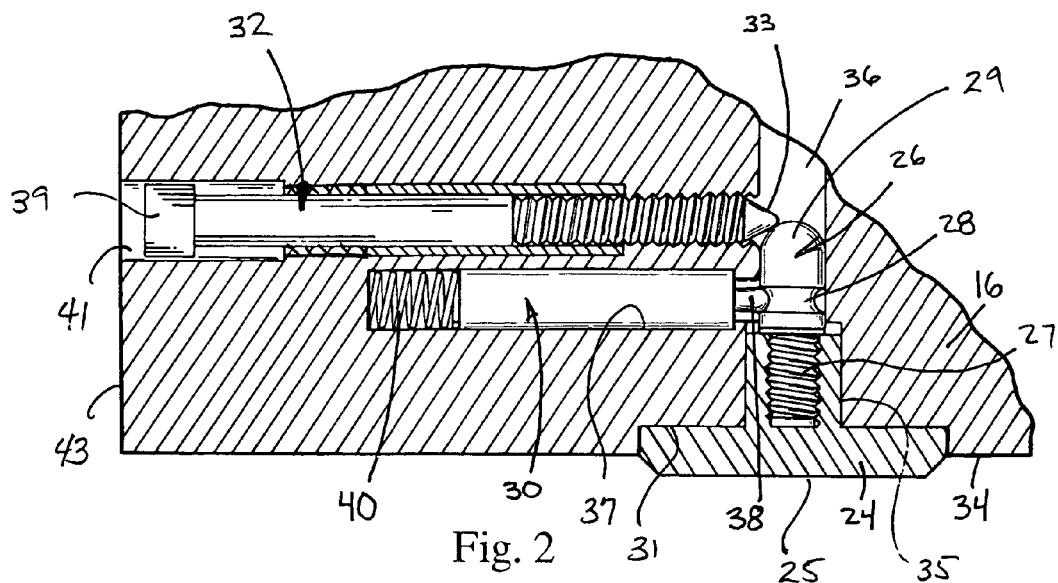
FIG. 2 is cut away view illustrating a volume control insert fully seated and locked in place within a mold half.

Referring now to FIG. 2, the volume control insert 22 includes a body or mold detail 24 with a surface 25 defining a portion of the cavity 20 and, therefore, the article to be molded. As further discussed below, the mold detail 24 can be exchanged with another mold detail 24 whose shape protrudes farther into the mold cavity 20 thereby changing the volume of the molded container. The mold detail 24 is received into an appropriately shaped recess 31 formed in the mold cavity surface 34.

A boss 35, on the rear surface of the mold detail 24, supports a retention member 26 that extends away from the mold detail 24. Both the retention member 26 and the boss 35 are received in a stepped bore 36 formed in the recess 31 in the mold cavity surface 34. The retention member 26 is engaged by a locking member 30 to retain the mold detail 24 within the mold half 18.

Figure 3:
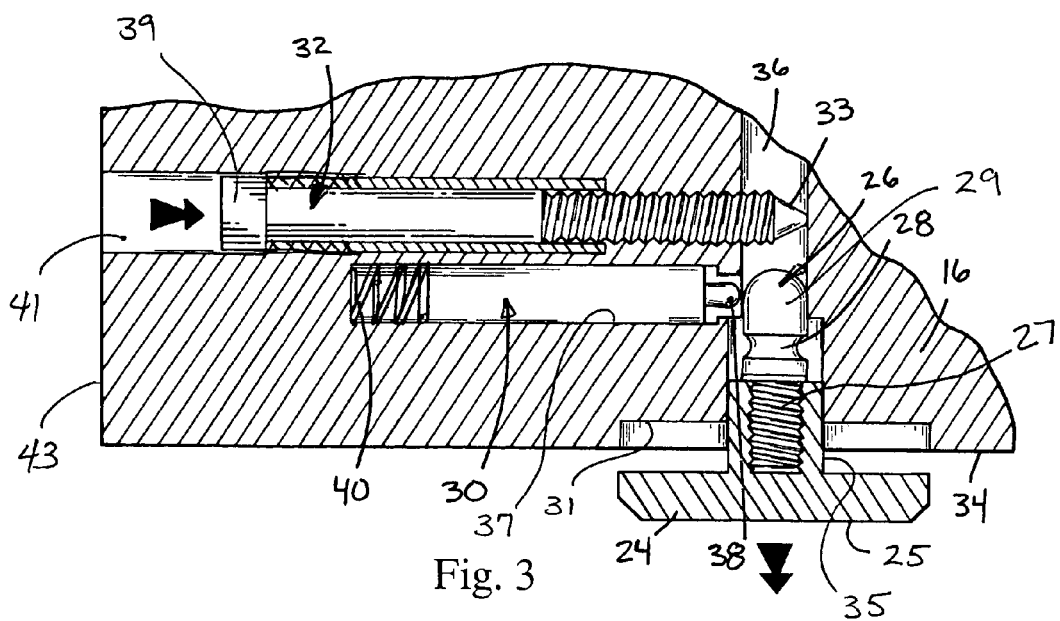
FIG. 3 is cut away view illustrating the volume control insert released from the mold half.

In FIGS. 2–3, the retention member 26 is illustrated as a shoulder bolt 26. The shoulder bolt 26 has a threaded end 27, a rounded end 29 opposite the threaded end 27, and a circumferential groove 28 located generally adjacent to the distal end 29. The threaded end 27 of the shoulder bolt 26 is received into a tapped bore in the boss 35 of the mold detail 24.

As seen in FIGS. 2–3 the locking member 30 is illustrated as a spring plunger 30 including a tip 38 on one end and a spring 40 on the other. The spring plunger 30 is received in a bore 37 in the mold 16 oriented transversely to and intersecting with the stepped mounting bore 36. The spring plunger 30 is positioned such that the plunger tip 38 protrudes into the stepped mounting bore 36 at a location that aligns with the groove 28 on the shoulder bolt 26 when the mold detail 24 is fully inserted into the stepped mounting bore 36. Being spring biased, when the rounded edge of the shoulder bolt 26 contacts the plunger tip 38, the plunger tip 38 is pushed back compressing the spring 28, as the shoulder bolt 26 is inserted into the mounting bore 36. The spring 28, being seated against the mold 16, will force the plunger tip 38 into the groove 28, locking the mold detail 24 into place, once the mold detail 24 is fully inserted and the groove 28 becomes properly aligned with the plunger tip 38.

After initial set up and running of the molding machine 10, it may be necessary to adjust the volume of the containers being molded so that the apparent volume of the material or fluid therein will be perceived by an end consumer as being proper for the amount of material or fluid stated on the container. This is achieved by changing the mold detail 24 in favor of one protruding more or less into the mold cavity 20 as the situation dictates. With the present invention, this is easily done through incorporation of a release member 32.

As seen in FIGS. 2–3, the release member 32 is illustrated as a jackscrew 32. The jackscrew 32, is located within the mold 16 and oriented transversely to the stepped mounting bore 36 in a threaded bore the mold 16. The location of the jackscrew 32 is aligned with the shoulder bolt 26 so that as the jackscrew 32 is turned, its chamfered tip 33 will be advanced into the stepped mounting bore 36 and engage the distal end 29 of the shoulder bolt 26. Engagement with the shoulder bolt 26 forces the shoulder bolt 26 in a direction out of the mounting bore 36. This movement of the shoulder bolt 26 forces back the plunger tip 38, compressing the plunger spring 40, moving the plunger tip 38 out of the groove 28. As the shoulder bolt 26 is pushed further out of the mounting bore 36, the tip 38 of the spring plunger 30 completely disengages the groove 28.

To cause advancement of the jackscrew 32, drive head 39 of the jackscrew 32, located opposite of the tip 33, is accessible through an opening 41 in a side face 43 of the mold half 18. The head 39 maybe provided with various shapes or means to enable it to be driven by an appropriate tool such as a screwdriver, hex driver, wrench or other tool.

Alternately, the jackscrew 32 can be replaced with other constructions for the release member 32 not requiring threading in order to advance the release member. For example, the release member 32 may be manually slid forward to extend and engage the retention member 26 and normally biased into retracted position out of engagement. Similarly, the locking member and the retention member may take alternative forms. For example the retention member could be a pin or recess in the body of the volume control insert engaged by a movable hook or member located in the mold.

Figure 4:
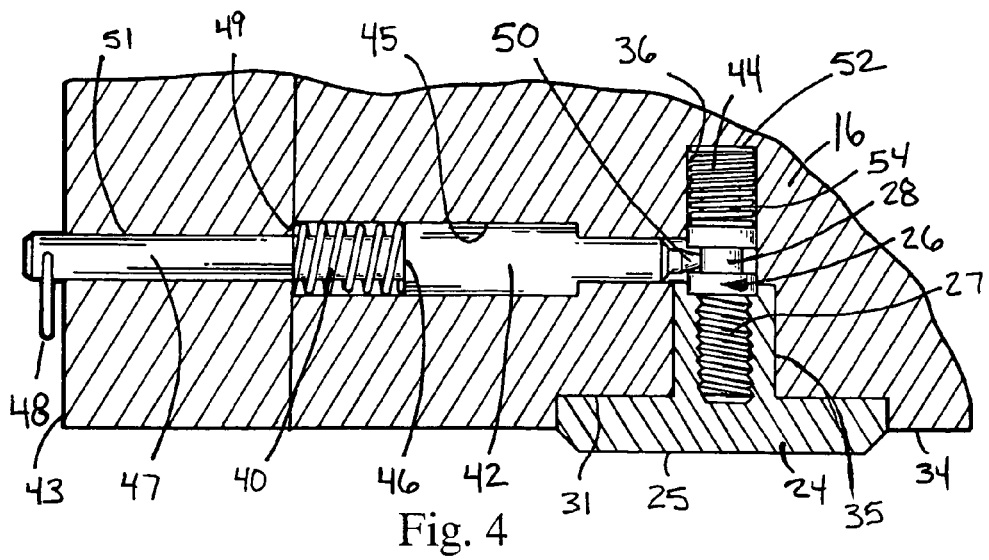
FIG. 4 is a cut away view of a second embodiment with the volume control insert fully seated and locked in place.
Figure 5:
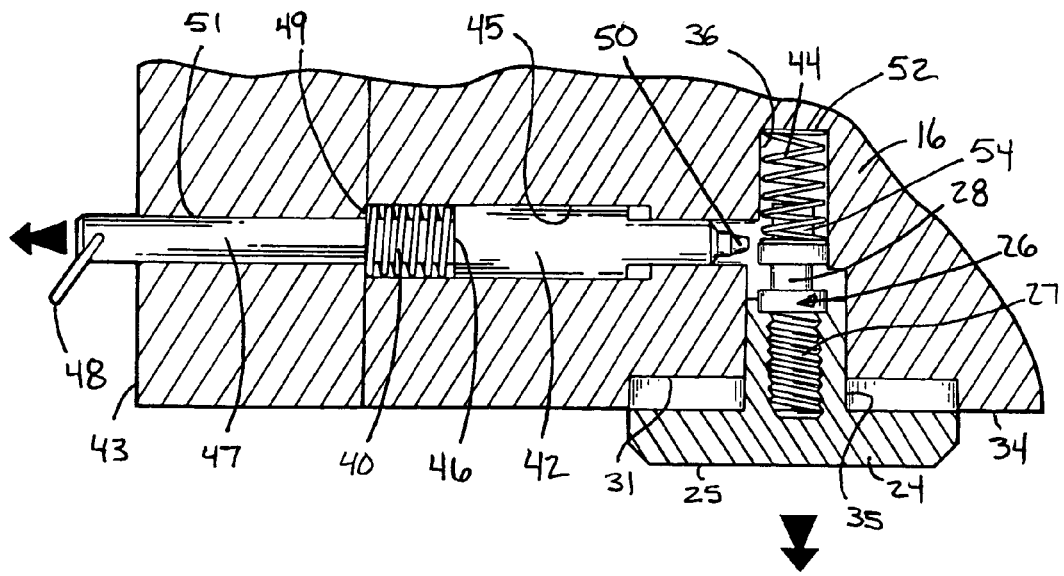
FIG. 5 is a cut away view of the second embodiment illustrating the volume control insert released from the mold half.

Now referring to FIGS. 4 and 5 another embodiment of the invention provides for volume control insert 22 including a mold detail 24 and a retention member 26. In this embodiment the shoulder bolt 26 has a threaded end attached to the boss 35 of the mold detail 24, a circumferential recess 28 and a distal end 54 adapted to seat against a compression spring 44.

The locking member 42 is illustrated in this embodiment as a plunger rod 42. The plunger rod 42 includes a shaft with a shoulder 46 and a tip 50 on one end. A stepped bore 45, is located in the mold 16 oriented transversely to and intersecting the mounting bore 36. The plunger rod 42 is received by the stepped bore 45, the tip 50 of the plunger rod 42 protrudes into the mounting bore 36. A plunger spring 40, located and compressed between the shoulder 46 of the plunger rod 42 and a surface 49 of the mold 16, is provided such that the shaft of the plunger rod 42 extends through the plunger spring 40. Being compressed between the shoulder 46 of the plunger rod 42 and the surface 49 of the mold 16, the plunger spring 40 biases the plunger tip 50 into the mounting bore 36. The plunger tip 50 is aligned with the shoulder bolt 26 such that the plunger tip 50 will engage with the groove 28 on the shoulder bolt 26 when the mold detail 24 is fully seated in the recess 31 of the mold surface 34, locking the mold detail 24 into place.

The release member 47 is illustrated in this embodiment as an extension of the plunger rod 42 providing a bore 51 in a side face 43 of the mold 16. A ring 34 is attached to the end of the plunger rod 42. The ring 34 maybe pulled with one hand, retracting the plunger tip 50 from the groove 28 in the shoulder bolt 26, while the mold detail 24 is held with the other hand.

To aid in removal of the mold detail 24, a compression spring 44 is seated in the end of the mounting bore 36 against a surface 52 of the mold 16. The compression spring 44 is aligned to interface with the distal end 54 of the shoulder bolt 26. Biasing the volume control insert 26 away from the mold cavity surface 34, the spring 44 is compressed when the shoulder bolt 26 is inserted into the mounting bore 36. The volume control insert 26 is ejected from the mounting bore 36, when the plunger tip 35 is disengaged from the groove 28 in the shoulder bolt 26.

As a person skilled in the art will readily appreciate, the above description is meant as an illustration of implementation of the principles depicted in this invention. The description is not intended to limit the scope or application of this invention in that the invention is susceptible to modification, variation and change, without departing from the spirit of this invention, as defined in the following claims.

I claim:

1. A molding machine for blow molding a plastic article comprising:
   a frame;
   a mold supported by the frame, the mold having a first mold half and a second mold half, both of the mold halves including surfaces cooperating to form a cavity in the shape of the plastic article;

a mold insert located in at least one of the mold halves, the mold insert including a body having a surface that defines a portion of the cavity, the mold insert further including a retention member received interiorly in the one of the mold halves;

a locking member supported by the one of the mold halves, the locking member located so as to be engageable with the retention member when the body is received within the one of the mold halves, the locking member including a spring biasing the locking member toward engagement with the retention member; and a release member supported by the one of the mold halves, the release member being accessible from an exterior of the one of the mold halves without removal of the one of the mold halves from the molding machine and adapted to disengage the locking member from the retention member whereby the mold insert is removable from the one of the mold halves.

2. The molding machine according to claim 1, wherein the release member is movable between a retracted and an extended position, during movement into the retracted position the release member causes the locking member to disengage from the retention member.

3. The molding machine according to claim 1, wherein the release member is movable between a retracted position and an extended position, during movement into the extended position the release member causes the locking member to disengage from the retention member.

4. The molding machine according to claim 3, wherein the release member is threaded.

5. The molding machine according to claim 1, wherein the locking member engages a recess in the retention member.

6. A molding machine for blow molding a plastic article comprising:

a frame;

a mold supported by the frame, the mold having a first mold half and a second mold half, both of the mold halves including surfaces cooperating to form a cavity in the shape of the plastic article;

a mold insert located in at least one of the mold halves, the mold insert including a body having a surface that defines a portion of the cavity, the mold insert further including a retention member received interiorly in the one of the mold halves;

a locking member supported by one of the mold halves, the locking member located so as to be engageable with the retention member when the body is received within the one of the mold halves, the locking member engaging a recess in the retention member and the recess being a circumferential groove around the retention member; and a release member supported by the one of the mold halves, the release member being accessible from an exterior of the one of the mold halves without removal of the one of the mold halves from the molding machine and adapted to disengage the locking member from the retention member whereby the mold insert is removable from the one of the mold halves.

7. The molding machine according to claim 1, wherein the release member applies force directly to the locking member causing it to disengage from the retention member.

8. The molding machine according to claim 7, wherein the release member is coupled to the locking member.

9. The molding machine according to claim 1, further comprising a biasing member located within the one of the mold halves and adapted to bias the body away from the one of the mold halves when the locking member is disengaged from the retention member.

10. A mold assembly for blow molding a plastic article, comprising:

a mold having a first mold half and a second mold half, both of the mold halves including surfaces cooperating to form a cavity in the shape of the plastic article;

a mold insert located in at least one of the mold halves, the mold insert including a body having a surface that defines a portion of the cavity, the mold insert further including a retention member received interiorly in the one of the mold halves;

a locking member supported by the one of the mold halves, the locking member located so as to be engageable with the retention member when the body is received within the one of the mold halves, the locking member including a spring biasing the locking member toward engagement with the retention member; and a release member supported by the one of the mold halves, the release member being accessible from an exterior of the one of the mold halves without disassembly of the one of the mold halves and adapted to disengage the locking member from the retention member whereby the mold insert is removable from the one of the mold halves.

11. The mold assembly according to claim 10, wherein the release member is moveable between a retracted position and an extended position during movement into the retracted position the release member causes the locking member to disengage from the retention member.

12. The mold assembly according to claim 10, wherein the release member is movable between a retracted position and an extended position, during movement into the extended position the release member causes the locking member to disengage from the retention member.

13. The mold assembly according to claim 12, wherein the release member is threaded.

14. The mold assembly according to claim 10, wherein the locking member engages with a recess in the retention member.

15. The mold assembly according to claim 14, wherein the retaining member is generally cylindrical and the recess is a circumferential groove around the retention member.

16. The mold assembly according to claim 10, wherein the release member applies force directly to the locking member causing it to disengage from the retention member.

17. The mold assembly according to claim 16, wherein the release member is coupled to the locking member.

18. The mold assembly according to claim 10, further comprising a biasing member located within the one of the mold halves and adapted to bias the body away from the one of the mold halves when the locking member is disengaged from the retention member.

19. A molding machine incorporating the mold assembly of claim 10.

\* \* \* \* \*